(12) United States Patent
Allison

(10) Patent No.: US 10,036,505 B2
(45) Date of Patent: Jul. 31, 2018

(54) CERAMIC-BACKED ELBOW

(71) Applicant: Progressive Products, Inc., Pittsburg, KS (US)

(72) Inventor: Todd N. Allison, Pittsburg, KS (US)

(73) Assignee: Progressive Products, Inc., Pittsburg, KS (US)

( * ) Notice: Subject to any disclaimer, the term of this patent is extended or adjusted under 35 U.S.C. 154(b) by 328 days.

(21) Appl. No.: 14/694,531

(22) Filed: Apr. 23, 2015

(65) Prior Publication Data

US 2015/0308607 A1 Oct. 29, 2015

Related U.S. Application Data

(60) Provisional application No. 61/983,858, filed on Apr. 24, 2014.

(51) Int. Cl.
*F16L 43/00* (2006.01)
*F16L 57/06* (2006.01)
*F16L 58/14* (2006.01)

(52) U.S. Cl.
CPC ............. *F16L 57/06* (2013.01); *F16L 43/002* (2013.01); *F16L 58/14* (2013.01)

(58) Field of Classification Search
USPC ........... 285/179, 15–16, 125.1, 129.1–129.2, 285/132.1, 133.6, 179.1–179.2, 183, 285/293.1
See application file for complete search history.

(56) References Cited

U.S. PATENT DOCUMENTS

| 3,833,267 | A | 9/1974 | McCumber |
| 4,387,914 | A | 6/1983 | Paulson et al. |
| 4,865,353 | A | 9/1989 | Osborne |
| 5,060,984 | A | 10/1991 | Hess |
| 6,531,019 | B2 | 3/2003 | Usui |
| 7,303,359 | B1 | 12/2007 | Damman et al. |
| 7,520,535 | B2 | 4/2009 | Gronquist |
| 2008/0169642 | A1 | 7/2008 | Yang et al. |

FOREIGN PATENT DOCUMENTS

| DE | 636383 | 10/1936 |
| DE | 827624 | 1/1952 |
| WO | 1982004302 | 12/1982 |

OTHER PUBLICATIONS

"Combined Search and Examination Report under Sections 17 and 18(3)", UK Appln. No. GB1507015.4, dated Sep. 29, 2015.

*Primary Examiner* — Aaron M Dunwoody
*Assistant Examiner* — Fannie C Kee
(74) *Attorney, Agent, or Firm* — Law Offices of Mark Brown, LLC; Christopher M. DeBacker

(57) ABSTRACT

A ceramic-backed elbow featuring an extended chamber which alters the flow of fluent through the elbow section. This chamber is lined with a ceramic material and ceramic tiles. The remainder of the elbow is similarly coated with a ceramic mixture. The elbow could be placed into a coating pan upon the tiles being adhered to the elbow, and the entire elbow may be coated with an abrasive-resistant coating. A thin metal skin may then be applied over the entire surface of the coating.

6 Claims, 2 Drawing Sheets

CERAMIC-BACKED ELBOW

CROSS-REFERENCE TO RELATED APPLICATION

This application claims priority in U.S. Provisional Patent Application No. 61/983,858, filed Apr. 24, 2014, which is incorporated herein by reference.

BACKGROUND OF THE INVENTION

1. Field of the Invention

The present invention relates generally to a ceramic-backed elbow, and more specifically to wear-resistant pipe elbow featuring a ceramic extension for providing wear-resistance while effecting short radius turns in fluent transport systems.

2. Description of the Related Art

Existing wear-resistant elbows are made of typical materials which eventually wear over time. Existing "smart elbows," such as those taught by U.S. Pat. No. 4,387,914 to Paulson et al. and assigned to HammerTek Corporation of Landisville, Pa. suffer from this issue. What is needed is a short radius elbow with the benefits of ceramic tile and ceramic mixture components to increase the durability and wear-resistance of the pipe elbow.

Heretofore there has not been available a ceramic-backed elbow with the advantages and features of the present invention.

BRIEF SUMMARY OF THE INVENTION

The present invention generally provides a ceramic-backed elbow featuring an extended chamber which alters the flow of fluent through the elbow section. This chamber is lined with a ceramic material and ceramic tiles to increase the durability and wear-resistance of the elbow. The remainder of the elbow is similarly coated with a ceramic mixture for similar wear-resistance.

Alternatively, the entire structure may be covered with ceramic tiles.

Alternatively, the tiles can be applied prior to a coating being placed over the entirety of the elbow, except for the open connecting ends of the elbow. This can be done by placing the elbow into a coating pan and covering the elbow with the abrasive-resistant material.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Ceramic-Backed Elbow 2

A preferred embodiment features a low radius elbow 4 including an extension with a cavity 5, sometimes referred to as a deflection zone, similar to the Smart Elbow® produced by HammerTek Corporation of Landisville, Pa. The extension is surrounded by several ceramic tiles 6 which increase the life of the elbow by providing wear-resistance. The remainder of the elbow may be coated with a ceramic mixture 8 that similarly increases the life of the elbow. Due to the majority of wear occurring within the cavity 5, the ceramic tiles 6 are only necessarily placed in proximity to the cavity. However, they could be placed throughout the elbow if desired.

As material flows through the elbow, the elbow tends to wear out, especially in the deflection zone cavity 5. When using highly abrasive material, like powders, the wearing out of the elbow 4 occurs even faster. The ceramic tiles 6 are highly resistant to abrasive wear and extend the life of the elbow for much longer than a non-protected elbow.

III. Alternative Embodiment Coated Elbow 22

Figure 1:
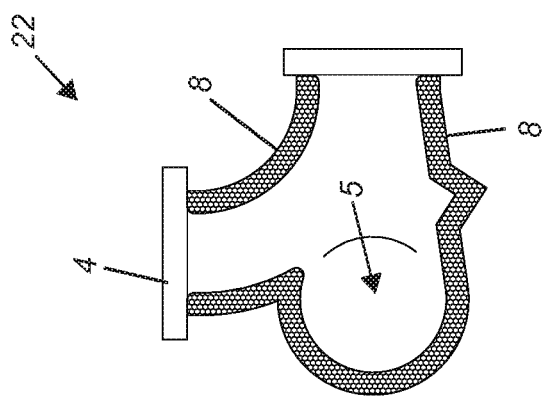
FIG. 1 is a side sectional view of an embodiment of the present invention.
Figure 2:
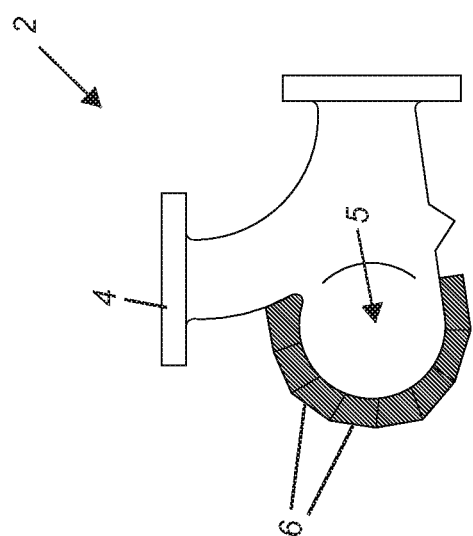
FIG. 2 is a side sectional view of an alternative embodiment of the present invention.

FIG. 2 shows an elbow 4 with a ceramic coating 8, or other abrasive resistant coating such as a ceramic mixture, a cement mixture, or a urethane mixture, is applied to all surfaces of the elbow 4, except for the open ends of the elbow where the elbow connects to other pipe sections. This ceramic coating is applied similarly to the related patent application Ser. No. 14/694,168, assigned to Progressive Products, Inc. of Pittsburgh, Kans., which is incorporated in its entirety herein by reference. The method of coating a pipe section includes placing the elbow into a coating pan (see, related patent application Ser. No. 14/694,168) while leaving the ends of the elbow exposed, coating the elbow with the abrasive-resistant material, and allowing the material to harden. A thin metal skin 34 can be placed over the abrasive-resistant material to provide additional abrasive resistance and to allow for easy patching at 38 to further extend the life of the elbow, as shown in FIG. 3.

IV. Alternative Embodiment Coated Ceramic-Backed Elbow 32

Figure 3:
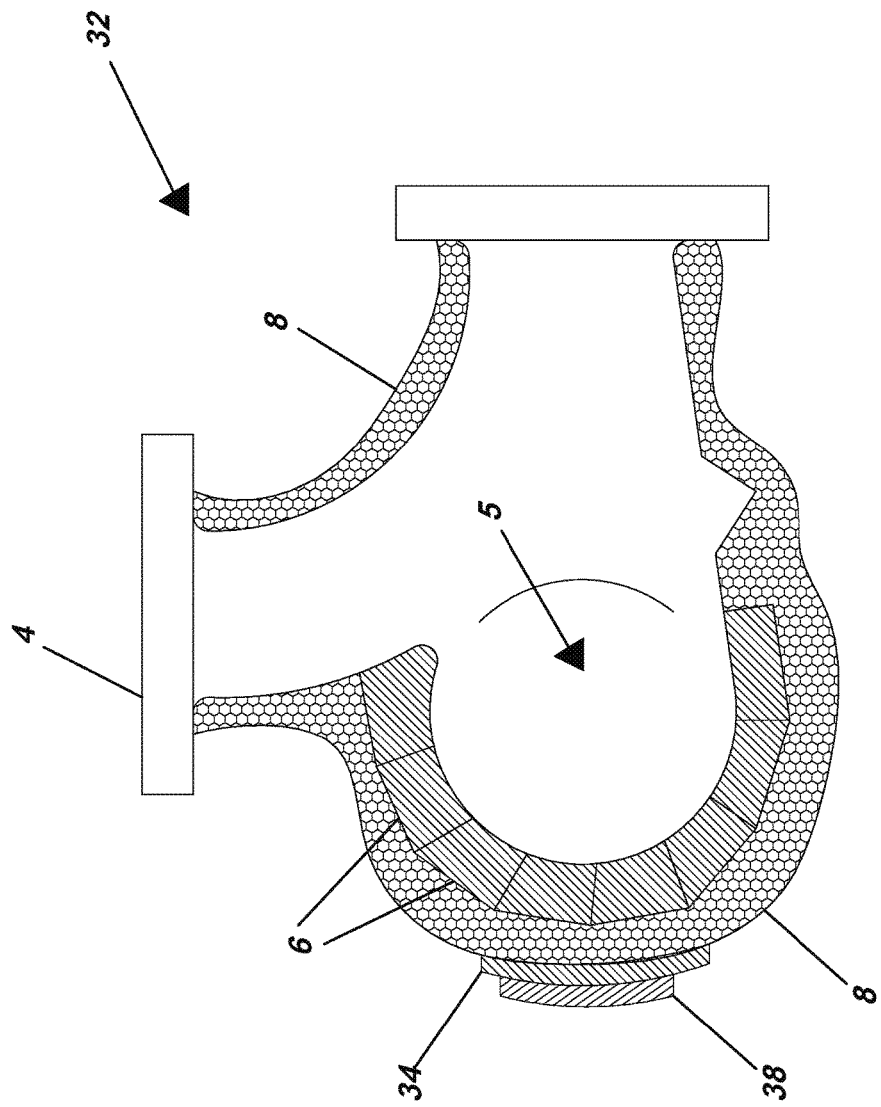
FIG. 3 is a side sectional view of yet another alternative embodiment of the present invention.

FIG. 3 shows an elbow 4 with a ceramic coating 8 and several ceramic tiles, which combines the two embodiments disclosed above. This provides the maximum level of wear-resistant protection to the elbow and extends the life of the elbow for several times the length of an elbow alone.

Any other pipe section, including straight pipe sections, could be fitted with ceramic tiles 6 and/or abrasive-resistant coatings 8; however, the elbow 4 with a deflection zone cavity 5 presents the best example of a pipe section requiring high levels of abrasion resistance to prevent constant replacement of pipe section parts, which can cause a shutdown in production.

It is to be understood that while certain embodiments and/or aspects of the invention have been shown and described, the invention is not limited thereto and encompasses various other embodiments and aspects.

Having thus described the disclosed subject matter, what is claimed as new and desired to be secured by Letters Patent is:

1. A fluent material handling system including a wear-resistant elbow, the system comprising:
    the elbow including a first open end, a second open end, and a bend including an interior face, an exterior face, an inner arc, and an outer arc;
    a plurality of abrasion-resistant tiles adhered to the exterior face of said bend, said plurality of abrasion-resistant tiles configured to prevent material traveling through said elbow from forming a leak in said elbow;
    said bend including a continuous annular channel;
    a chamber formed on the outer arc of said bend opposite said first open end;
    a layer of coating material covering at least a portion of said elbow and said plurality of abrasion-resistant tiles, said coating material adhering said plurality of abrasion-resistant tiles to said elbow; and
    an abrasion-resistant metal skin applied to at least a portion of the elbow exterior over said coating material.

2. The system of claim 1 wherein said coating material comprises an ingredient selected from the list comprising: ceramic; cement; and urethane.

3. The system of claim 1, further comprising a metal patch configured to patch a hole in said abrasion-resistant metal skin.

4. A method of constructing an abrasion-resistant elbow for a fluent pipe system, the method comprising the steps:
    adhering a plurality of ceramic tiles to an exterior face of an elbow comprising a first open end, a second open end, and a bend including an interior face, an exterior face, an inner arc, and an outer arc;
    connecting said elbow first open end to a first pipe section;
    connecting said elbow second end to a second pipe section; and
    transferring fluent material through said pipe section, wherein said plurality of ceramic tiles are configured to prevent material traveling through said elbow from forming a leak within said elbow;
    said bend including a continuous annular channel;
    a chamber formed on the outer arc of said bend opposite said first open end, said chamber opening into said channel on one side tangential to a channel wall with the other side of said chamber merging with said outer arc at a point outwardly offset parallel to a central axis of an inlet port by one quarter of a diameter of the channel;
    applying a coating material over said elbow and said plurality of ceramic tiles such that said plurality of ceramic tiles are adhered to said elbow; and
    placing a thin metal skin over an exterior of said coating material.

5. The method of claim 4, wherein said coating material comprises an ingredient selected from the list comprising: ceramic; cement; and urethane.

6. The method of claim 4, further comprising the steps:
    patching a hole formed by said fluent material through said pipe section, said coating material, and said metal skin with a metal patch applied to an exterior face of said metal skin.

* * * * *